June 12, 1956 — C. R. SMITH — 2,750,003
ADJUSTABLE OIL FILLER SPOUT
Filed May 4, 1953
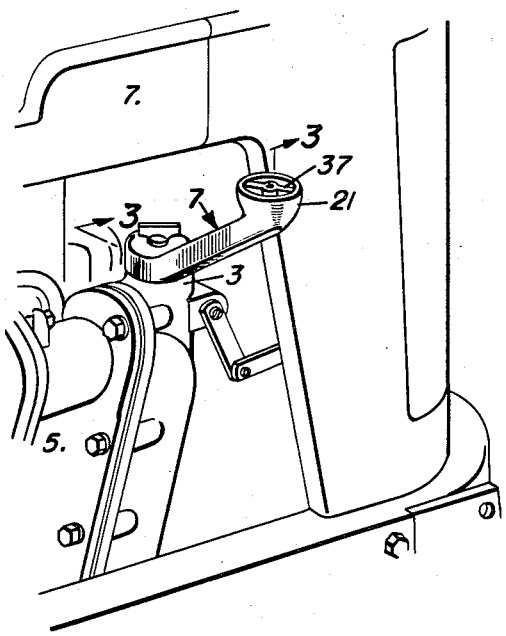
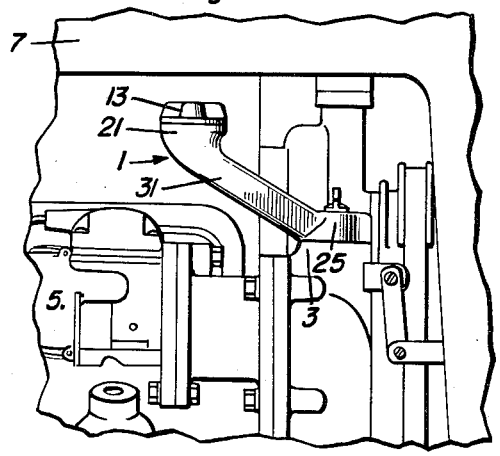
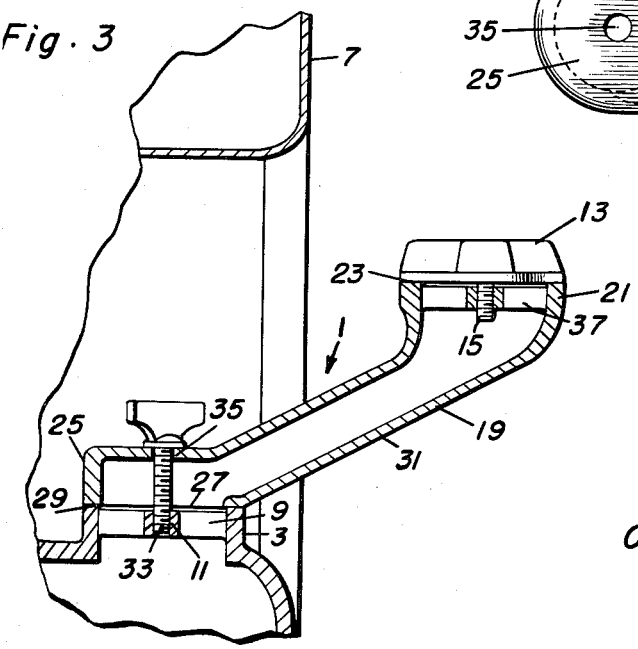
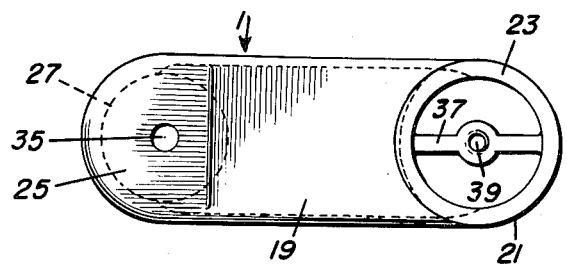
Clarence R. Smith
INVENTOR.
BY *Clarence A. O'Brien
and Harvey B. Jacobson*
Attorneys

2,750,003
ADJUSTABLE OIL FILLER SPOUT

Clarence R. Smith, Cozad, Nebr.

Application May 4, 1953, Serial No. 352,711

1 Claim. (Cl. 184—105)

My invention relates to improvements in adjustable oil filler spouts for tractor engines.

The primary object of my invention is to provide a filler spout adapted for attachment to the upright oil filler neck of a tractor engine to be swung under the hood of the engine in an out of the way position when not in use, or to be swung from under the hood into a position for filling purposes.

Another object is to provide a filler spout of the character and for the purpose above set forth and by means of which oil may be introduced into the filler neck from oil cans which are not provided with a spout thereon.

Still another object is to provide a filler spout easily attachable to and detachable from the conventional upright filler neck of the tractor engine and which is easily swingable thereon.

Still another object is to provide a filler spout adapted to be closed when not in use by the conventional closure cap for the filler neck of the engine.

Other and subordinate objects, together with the precise nature of my improvements will become readily apparent when the succeeding description and claims are read with reference to the drawing accompanying and forming part of this specification.

In said drawing:

Figure 1 is a fragmentary view in perspective of my improved filler spout attached to the filler neck of a tractor and swung out from under the hood of the engine into a position for filling purposes;

Figure 2 is a fragmentary view in side elevation showing the filler spout swung under the hood in an out of the way protected position when not in use.

Figure 3 is an enlarged view in vertical section taken on the line 3—3 of Figure 1, and Figure 4 is an enlarged view in plan of the filler spout detached.

Referring to the drawing by numerals, my improved filler spont 1 has been shown therein as applied to the upstanding tubular oil filler neck 3 of a conventional tractor engine 5 covered by a hood 7 open at one side thereof. The filler neck 3 is provided with a cross piece 9 having a central threaded bore 11 therein for attachment of a closure cap 13 on said neck by an axial threaded stud 15 on the cap adapted to be turned into the bore 11.

The filler spout 1 of my invention comprises a conduit 19 of any suitable metal having an upwardly opening circular, mouth end 21 with a horizontal rim 23, a relatively lower horizontal discharge end 25 formed with a circular bottom discharge opening 27 and fitting on the rim 29 of the neck 3, and a throat portion 31 inclining downwardly from the mouth end 21 to the discharge end 25. The throat portion 31 and the discharge end 25 are flattened into substantially rectangular cross section for strengthening purposes.

A wing head screw bolt 33, forming a thumb screw, is threaded through an axial top opening 35 in the discharge end 25 and into the bore 11 to secure the filler spout 1 on said neck 3 for lateral swinging under the hood 7 or out from under the hood, as desired.

A diametrical crossbar 37 is suitably fixed in the mouth end 21 and provided with a central threaded bore 39, and mouth end 21 is of the same diameter as the neck 3 so that the closure cap 13 for the neck 3 may be applied to the mouth end 21 to close the same, and the spout, merely by turning the stud 15 into the bore 39.

To apply my improved filler spout, it is merely necessary to remove the cap 13 of the filler neck 3, fasten the discharge end 25 on the neck 3, in the manner described, and secure the cap 13 on the mouth end 21. Thus an easily applied closed filler spout is provided on the filler neck 3 for swinging into position for filling an opening by removing the cap 13, or for swinging laterally into protected out of the way position under the hood 7 with the cap 13 applied to close the spout against entrance of dust or dirt through the same. As shown in Figures 1 and 3, when the spout 1 is swung from under the hood 7 it projects well forwardly out of the same so that the mouth end 21 is readily accessible. The screw bolt 33 may be loosened for swinging the spout 1 and tightened to hold the spout in either filling position or the out of the way protected position shown in Figure 2. However, bolt 33 and the discharge end 25 and neck 29 may be so related that loosening and tightening of said bolt is unnecessary.

The foregoing will, it is believed, suffice to impart a clear understanding of my invention, without further explanation.

Manifestly, the invention, as described, is susceptible of modification without departing from the inventive concept and right is herein reserved to such modifications as fall within the scope of the appended claim.

What is claimed as new is as follows:

A filler spout and closure for an engine crankcase having an upstanding tubular filler neck with a centrally bored diametrical crosspiece therein, said spout comprising a horizontal downwardly opening discharge end provided with a flat top and a circular bottom of the same diameter as said neck adapting said discharge end to seat on the neck, a flattened throat portion of rectangular cross section inclining upwardly from one side of said discharge end and terminating in a horizontal circular and upwardly opening mouth portion of the same diameter as said neck and oblique to said throat and provided with a centrally bored diametrical cross bar therein, a thumb screw threaded centrally through the top of said discharge end and adapted to be threaded into the bore in the crosspiece to detachably attach said discharge end on said neck, and a flat bottom imperforate closure cap for said mouth portion and neck having a central stud threaded into the bore of the cross bar for detachably attaching said cap to said mouth portion, said stud being threadable into the bore of said crosspiece to attach said cap to said neck when said discharge end is detached from the neck.

References Cited in the file of this patent

UNITED STATES PATENTS

| 151,823 | Baldwin | June 9, 1874 |
| 1,351,338 | Magee | Aug. 31, 1920 |
| 1,512,947 | Page | Oct. 28, 1924 |
| 1,650,021 | Magee | Nov. 22, 1927 |